(12) United States Patent
Hirohashi (10) Patent No.: US 12,060,231 B2
(45) Date of Patent: Aug. 13, 2024

(54) MEASUREMENT CONTROL DEVICE, PACKAGING DEVICE AND MEASUREMENT CONTROL METHOD

(71) Applicant: OMRON Corporation, Kyoto (JP)

(72) Inventor: Yuki Hirohashi, Kyoto (JP)

(73) Assignee: OMRON Corporation, Kyoto (JP)

( * ) Notice: Subject to any disclaimer, the term of this patent is extended or adjusted under 35 U.S.C. 154(b) by 644 days.

(21) Appl. No.: 17/270,436

(22) PCT Filed: Mar. 6, 2019

(86) PCT No.: PCT/JP2019/008828
§ 371 (c)(1),
(2) Date: Feb. 23, 2021

(87) PCT Pub. No.: WO2020/144875
PCT Pub. Date: Jul. 16, 2020

(65) Prior Publication Data
US 2021/0253361 A1    Aug. 19, 2021

(30) Foreign Application Priority Data

Jan. 10, 2019 (JP) .................. 2019-002771

(51) Int. Cl.
*B65G 43/08* (2006.01)
*G01B 5/04* (2006.01)

(52) U.S. Cl.
CPC ............ *B65G 43/08* (2013.01); *G01B 5/046* (2013.01)

(58) Field of Classification Search
CPC ..... B65B 59/001; B65B 59/003; B65B 11/54; B65B 57/12; B65B 2210/04; B65B 43/08
See application file for complete search history.

(56) References Cited

U.S. PATENT DOCUMENTS

| 3,894,380 A | 7/1975 | Poulsen et al. |
| 5,524,420 A | 6/1996 | Ikuta |
| (Continued) |

FOREIGN PATENT DOCUMENTS

| CN | 1125189 | 6/1996 |
| CN | 205312054 | 6/2016 |
| (Continued) |

OTHER PUBLICATIONS

"Office Action of China Counterpart Application" with English translation thereof, issued on Jan. 18, 2022, p. 1-p. 16.
(Continued)

*Primary Examiner* — Timothy R Waggoner
(74) *Attorney, Agent, or Firm* — JCIPRNET (57) ABSTRACT

The present invention is to provide a measurement control device. A sensor unit 1 disposed at least in the horizontal direction perpendicular to the traveling direction in which the article G to be packaged is conveyed, and a pressing member detection unit D for detecting an article conveyance pressing member P mounted on the packaging device are connected to the measurement control device main body 2, and the measurement control device is provided with an acquisition signal stopping unit which stops acquisition of signals from the sensor unit 1 when the pressing member detection unit D detects the pressing member P, and a signal acquisition restarting unit which restarts acquisition of signals from the sensor unit 1 when the pressing member detection unit D does not detect the pressing member P.

8 Claims, 9 Drawing Sheets

(56) References Cited

U.S. PATENT DOCUMENTS

| | | | | |
|---|---|---|---|---|
| 5,655,356 | A | * | 8/1997 | Ginestra ................ B65B 11/48 53/504 |
| 6,955,029 | B2 | * | 10/2005 | Palumbo ............... B65B 59/001 53/469 |
| 8,466,380 | B2 | * | 6/2013 | Inoue .................... G01G 13/08 702/159 |
| 2008/0141625 | A1 | * | 6/2008 | Bilkie ..................... B65B 55/20 53/51 |
| 2008/0295461 | A1 | * | 12/2008 | Parmley ................. B65B 57/12 73/1.01 |
| 2008/0319566 | A1 | * | 12/2008 | McGuinness, Jr. ..... B65B 67/08 53/461 |
| 2018/0105307 | A1 | * | 4/2018 | Guzman ................. B65B 41/12 |
| 2023/0003507 | A1 | * | 1/2023 | Eki ........................ G01B 11/25 |

FOREIGN PATENT DOCUMENTS

| | | | | |
|---|---|---|---|---|
| CN | 107954031 | | 4/2018 | |
| JP | H10260025 | | 9/1998 | |
| JP | 2000177712 | | 6/2000 | |
| JP | 2002008188 | | 1/2002 | |
| JP | 2002202110 | | 7/2002 | |
| JP | 3592763 | | 11/2004 | |
| JP | 5325179 | | 10/2013 | |
| JP | 2015163842 | | 9/2015 | |
| JP | 2018177271 | | 11/2018 | |
| KR | 2017031415 A | * | 3/2017 | ............... B65C 9/00 |

OTHER PUBLICATIONS

"Search Report of Europe Counterpart Application", issued on Sep. 8, 2022, pp. 1-10.

"International Search Report (Form PCT/ISA/210) of PCT/JP2019/008828", mailed on Jun. 11, 2019, with English translation thereof, pp. 1-3.

"Written Opinion of the International Searching Authority (Form PCT/ISA/237) of PCT/JP2019/008828", mailed on Jun. 11, 2019, with English translation thereof, pp. 1-8.

* cited by examiner

MEASUREMENT CONTROL DEVICE, PACKAGING DEVICE AND MEASUREMENT CONTROL METHOD

CROSS-REFERENCE TO RELATED APPLICATION

This application is a 371 application of the International PCT application serial no. PCT/JP2019/008828, filed on Mar. 6, 2019, which claims the priority benefit of Japan Patent Application No. 2019-002771, filed on Jan. 10, 2019. The entirety of each of the above-mentioned patent applications is hereby incorporated by reference herein and made a part of this specification.

TECHNICAL FIELD

The present disclosure relates to a measurement control device used for controlling a packaging device or the like, a packaging device equipped with the measurement control device, and a measurement control method.

BACKGROUND ART

In a conventional horizontal pillow type packaging device, a "film feed amount", an "operation of a seal part (an operation timing and an operation speed)", and an "operation of a supply conveyor" are set according to an article to be packaged based on data registered in advance as product information before an operation thereof or by creating the data.

Therefore, when the operation starts by performing setting according to a certain article to be packaged and then it is intended to package another article to be packaged having a different size, it is necessary to temporarily stop the packaging device and to reset the settings each time according to a size of each of the other articles to be packaged.

In this way, when the settings are changed every time the article to be packaged is changed, it takes a lot of time each time, and waste of a film occurs due to an adjustment of the film, or the like when the settings are changed.

In order to avoid frequent re-settings as described above, a setting may be made according to the largest one among the articles to be packaged, and a small article to be packaged may also be packaged with a film having the same size. In this case, along with a large amount of waste in the film, the small article to be packaged is present in a large film, and thus a problem that an "appearance" of the packaging is deteriorated is caused.

An invention described in Patent Literature 1 below (FIG. 7) has been proposed as a solution to the above-described problem. According to this invention, it is not necessary to perform re-setting each time the size of the article to be packaged becomes different, and film is not wasted. Moreover, it is possible to provide a pillow type packaging device capable of quickly performing packaging with a good appearance.

Figure 7:
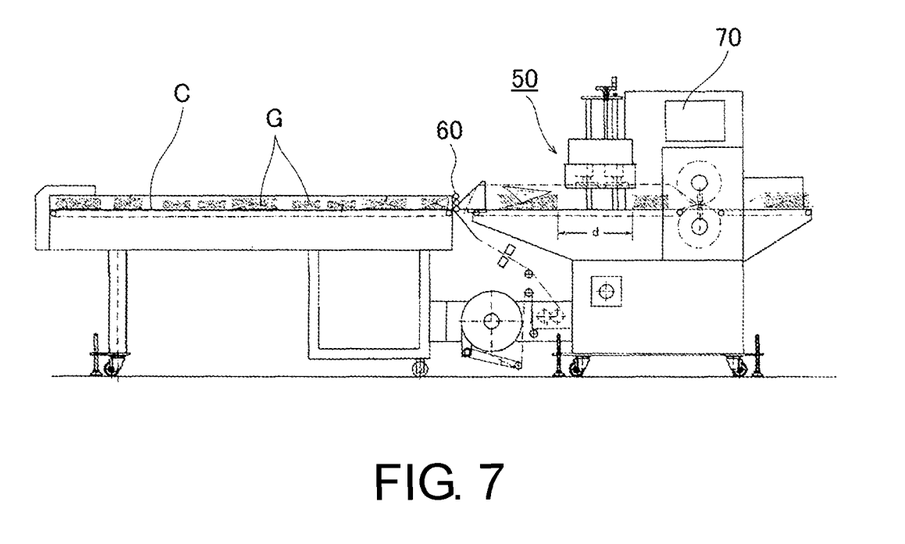
FIG. 7 is a side view showing a configuration example of a conventional packaging device.

The pillow type packaging device described in Patent Literature 1 is a pillow type packaging device including a packaging device main body 50, and a supply conveyor C which is disposed upstream of the packaging device main body 50 and supplies an article G to be packaged to the packaging device main body 50. The pillow type packaging device includes an article detection sensor 60 which detects a length of the article G to be packaged, and a control device 70 which calculates an operation pattern of a sealing means of a top seal part, an operation timing, and a length of a film required for packaging based on the length of the article G to be packaged calculated based on data detected by the article detection sensor 60, and controls an operation of the sealing unit based on the calculated results thereof.

According to the pillow type packaging device described in Patent Literature 1, even when articles G to be packaged having different lengths are continuously supplied to the packaging device main body 50, data regarding the length of the article G to be packaged can be detected for each of the articles G to be packaged by the article detection sensor 60, and control can be performed such that top sealing is performed with the operation pattern and operation timings of the sealing unit of the top seal part suitable for the article G to be packaged based on the length of the film required for packaging calculated based on the detected data.

Therefore, even when articles G to be packaged having different lengths continuously enter, or even when articles G to be packaged having the same long or short length continuously enter, film packaging with an optimum length for all articles G to be packaged can be optimally performed.

Thus, it is not necessary to perform setting for each of the different articles G to be packaged, film is not wasted, and film packaging with a good appearance can be performed.

Technical Problem

Figure 8:
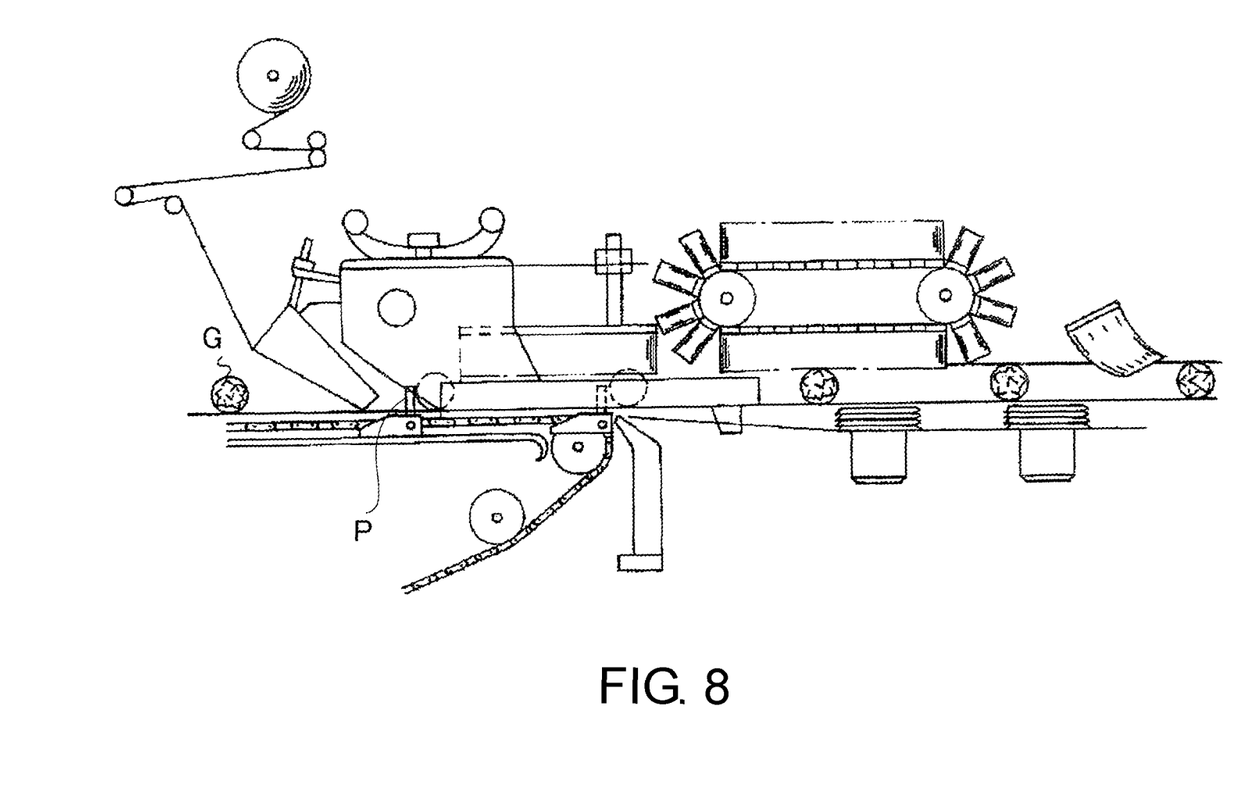
FIG. 8 is a side view showing a configuration example of another type of packaging device equipped with a conventional pressing member.
Figure 9:
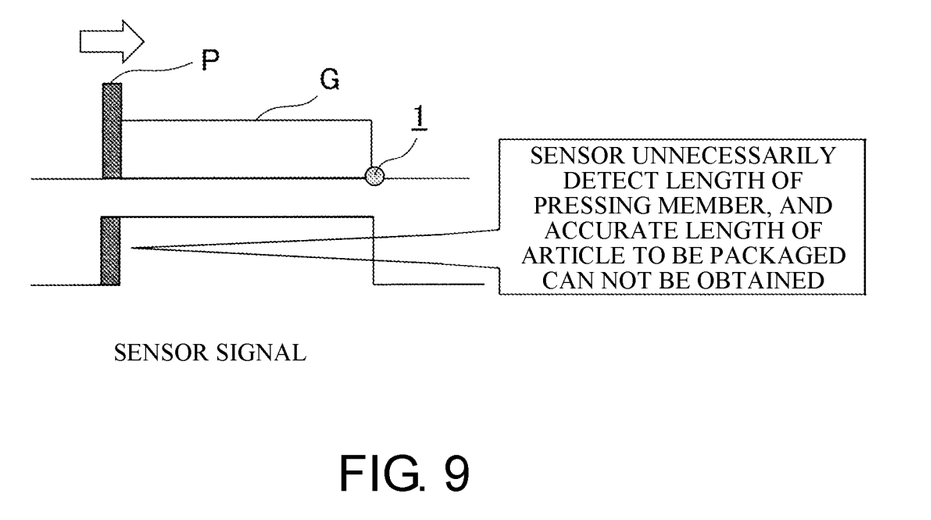
FIG. 9 is a side view showing a situation in which an article to be packaged is sensed using the conventional measurement control device.

However, there is a type of packaging device as described in Patent Literature 2 below. In the packaging device described in Patent Literature 2, as shown in FIG. 8, a pressing member P for reliably transferring the articles G to be packaged is provided.

Therefore, when the article detection sensor 60 described in Patent Literature 1 is applied to the packaging device of the type described in Patent Literature 2 to detect the length of the article G to be packaged, the article detection sensor 60 detects not only the length of the article G to be packaged but also a length including a length of the pressing member P as the length of the article G to be packaged.

Therefore, even when the packaging device of the type described in Patent Literature 2 is equipped with the article detection sensor 60 to detect the length of the article G to be packaged, there is a problem that the length of the article G to be packaged cannot be accurately detected, and it is difficult to optimally perform the optimum film packaging.

CITATION LIST

Patent Literature

[Patent Literature 1]
  Japanese Patent No. 5325179
[Patent Literature 1]
  Japanese Patent No. 3592763

SUMMARY OF INVENTION

The present disclosure has been made in view of the above-described problems, and provides a measurement control device, a packaging device equipped with the measurement control device, and a measurement control method capable of optimally performing optimum film packaging without wasting film and capable of performing film packaging with a good appearance, even in the case of a packaging device of a type equipped with a pressing member P and even in a case in which articles that have different sizes and shapes, such as agricultural products and bread, are packaged.

In order to achieve the above-described object, a measurement control device (1) according to the present disclosure is a measurement control device used for controlling a packaging device, in which a sensor unit in which a detection axis of a sensor is disposed at least in a horizontal (a width) direction orthogonal to a traveling (a length) direction in which an article to be packaged is conveyed, and a pressing member detection unit which detects an article conveyance pressing member which is provided in the packaging device are connected to a measurement control device main body, the measurement control device including:

a signal acquisition stopping unit configured to stop acquisition of a signal from the sensor unit according to detection of the pressing member by the pressing member detection unit.

a signal acquisition restarting unit configured to restart the acquisition of the signal from the sensor unit according to non-detection of the pressing member by the pressing member detection unit.

a width calculation unit provided on a side of the measurement control device main body to calculate a distance between the sensor unit and the article to be packaged based on information from the sensor unit and to calculate a width of the article to be packaged from the distance, and a shape calculation unit configured to calculate a shape of the article to be packaged including a length thereof.

According to the measurement control device (1), since the acquisition of the signal from the sensor unit is stopped according to the detection of the pressing member by the pressing member detection unit, when the length of the article to be packaged is calculated, it is possible to prevent a length of the pressing member in a traveling direction from being acquired.

Therefore, even in the case of a packaging device of a type equipped with the pressing member, or even in the case in which articles having different sizes and shapes, such as agricultural products and bread, are packaged, it is possible to optically perform optimal film packaging, and film packaging with a good appearance can be performed without wasting the film.

Further, in the measurement control device (1), a measurement control device (2) according to the present disclosure may further include:

a control command creation unit configured to create a control command based on a control program, and a drive control unit configured to control a drive unit such as a motor based on the control command.

According to the measurement control device (2), it is possible to realize accurate control based on accurate measurement, and thus even in the case in which articles to be packaged having different sizes and shapes, such as agricultural products and bread, are packaged, it is possible to optically perform optimal film packaging, and film packaging with a good appearance can be performed without wasting the film.

Also, in order to achieve the above-described object, a measurement control device (3) according to the present disclosure is a measurement control device used for controlling a packaging device, and the like, in which a sensor unit in which a detection axis of a sensor is disposed at least in a horizontal direction (a width direction) orthogonal to a traveling direction (a length direction) in which an article to be packaged is conveyed is connected to a measurement control device main body, the measurement control device including:

a width calculation unit provided on a side of the measurement control device main body to calculate a distance between the sensor unit and the article to be packaged based on information from the sensor unit and to calculate a width of the article to be packaged from the distance, a shape calculation unit configured to calculate a shape of the article to be packaged including a length thereof, and a pressing member length subtraction unit configured to subtract a length of an article conveyance pressing member mounted on a packaging device from the length of the article to be packaged obtained by the shape calculation unit.

According to the measurement control device (3), since the length of the article conveyance pressing member mounted on the packaging device is subtracted from the length of the article to be packaged obtained by the shape calculation unit, it is possible to prevent the length of the pressing member in a traveling direction from being acquired into the length of the article to be packaged.

Therefore, even in the case of a packaging device of a type equipped with the pressing member, or even in the case in which articles having different sizes and shapes, such as agricultural products and bread, are packaged, it is possible to optically perform optimal film packaging, and film packaging with a good appearance can be performed without wasting the film.

Further, in the measurement control device (3), a measurement control device (4) according to the present disclosure may further include:

a control command creation unit configured to create a control command based on a control program; and a drive control unit configured to control a drive unit such as a motor based on the control command.

According to the measurement control device (4), it is possible to realize accurate control based on accurate measurement, and thus even in the case in which articles to be packaged having different sizes and shapes, such as agricultural products and bread, are packaged, it is possible to optically perform optimal film packaging, and film packaging with a good appearance can be performed without wasting the film.

Also, in a measurement control device (5), in any one of the measurement control devices (1) to (4), the sensor unit may be configured by selecting one or more of an optical sensor, an ultrasonic sensor, a mechanical sensor, and an image pickup sensor.

According to the measurement control device (5), it is possible to select an optimal sensor according to a type of the article to be packaged and a mounting situation, and it is possible to promote accurate detection of the article to be packaged.

Also, a packaging device according to the present disclosure is a packaging device equipped with the measurement control device described in any one of the measurement control devices (1) to (5).

According to the packaging device (1), it is possible to prevent the length of the pressing member in the traveling direction from being incorporated into the length of the article to be packaged, and even in the case of a packaging device of a type equipped with the pressing member, or even in the case in which articles having different sizes and shapes, such as agricultural products and bread, are packaged, it is possible to optically perform optimal film packaging, and film packaging with a good appearance can be performed without wasting the film.

Further, a measurement control method (1) according to the present disclosure is a measurement control method in the measurement control device described in the measurement control device (1), the method including:

a signal acquisition stopping step of stopping acquisition of a signal from the sensor unit according to detection of the pressing member by the pressing member detection unit;

a signal acquisition restarting step of restarting acquisition of the signal from the sensor unit according to non-detection of the pressing member by the pressing member detection unit;

a signal acquisition step of acquiring information signal from the sensor unit;

a distance conversion step of converting the information signal acquired in the acquisition step into a distance;

a width calculation step of calculating a width of the article to be packaged from distance information converted in the distance conversion step; and an overall shape calculation step of calculating an overall shape including a length and a width of the article to be packaged from the acquired signal information.

According to the measurement control method (1), since the acquisition of the sensor signal from the sensor unit is stopped according to the detection of the pressing member by the pressing member detection unit, when the length of the article to be packaged is calculated, it is possible to prevent a length of the pressing member in a traveling direction from being acquired.

Therefore, even in the case of a packaging device of a type equipped with the pressing member, or even in the case in which articles having different sizes and shapes, such as agricultural products and bread, are packaged, it is possible to optically perform optimal film packaging, and film packaging with a good appearance can be performed without wasting the film.

Also, in the measurement control method (1), a measurement control method (2) according to the present disclosure may further include:

a control amount calculation step for calculating a control amount for the drive unit based on the overall shape information of the article to be packaged obtained in the overall shape calculation step;

a control command creation step of creating a control command based on a calculation result obtained in the control amount calculation step; and an output process step of performing an output process of the control command created in the control command creation step.

According to the measurement control method (2), it is possible to realize accurate control based on accurate measurement, and thus even in the case in which articles to be packaged having different sizes and shapes, such as agricultural products and bread, are packaged, it is possible to optically perform optimal film packaging, and film packaging with a good appearance can be performed without wasting the film.

Further, a measurement control method (3) according to the present disclosure is a measurement control method in the measurement control device described in the measurement control device (3), the method including:

a signal acquisition step of acquiring information signal from the sensor unit;

a distance conversion step of converting the information signal acquired in the acquisition step into a distance;

a width calculation step of calculating the width of the article to be packaged from distance information converted in the distance conversion step;

a shape calculation step of calculating the shape of the article to be packaged including a length thereof; and a pressing member length subtraction step of subtracting the length of article conveyance pressing member mounted on a packaging device from the length of the article to be packaged obtained by the shape calculation unit.

According to the measurement control method (3), since the length of the article conveyance pressing member mounted on the packaging device is subtracted from the length of the article to be packaged obtained by the shape calculation unit, it is possible to prevent the length of the pressing member in a traveling direction from being incorporated into the length of the article to be packaged.

Therefore, even in the case of a packaging device of a type equipped with the pressing member, or even in the case in which articles having different sizes and shapes, such as agricultural products and bread, are packaged, it is possible to optically perform optimal film packaging, and film packaging with a good appearance can be performed without wasting the film.

Further, in the measurement control method (3), a measurement control method (4) according to the present disclosure may further include:

a control amount calculation step of calculating a control amount for a drive unit based on shape information of the article to be packaged obtained in the subtraction step;

a control command creation step of creating a control command based on a calculation result obtained in the control amount calculation step; and an output process step of performing an output process of the control command created in the control command creation step.

According to the measurement control method (4), it is possible to realize accurate control based on accurate measurement, and thus even in the case in which articles to be packaged having different sizes and shapes, such as agricultural products and bread, are packaged, it is possible to optically perform optimal film packaging, and film packaging with a good appearance can be performed without wasting the film.

DESCRIPTION OF EMBODIMENTS

Hereinafter, embodiments of a measurement control device and a packaging device equipped with the measurement control device according to the present disclosure will be described with reference to the drawings.

Application Example 1 of Measurement Control Device

Figure 1:
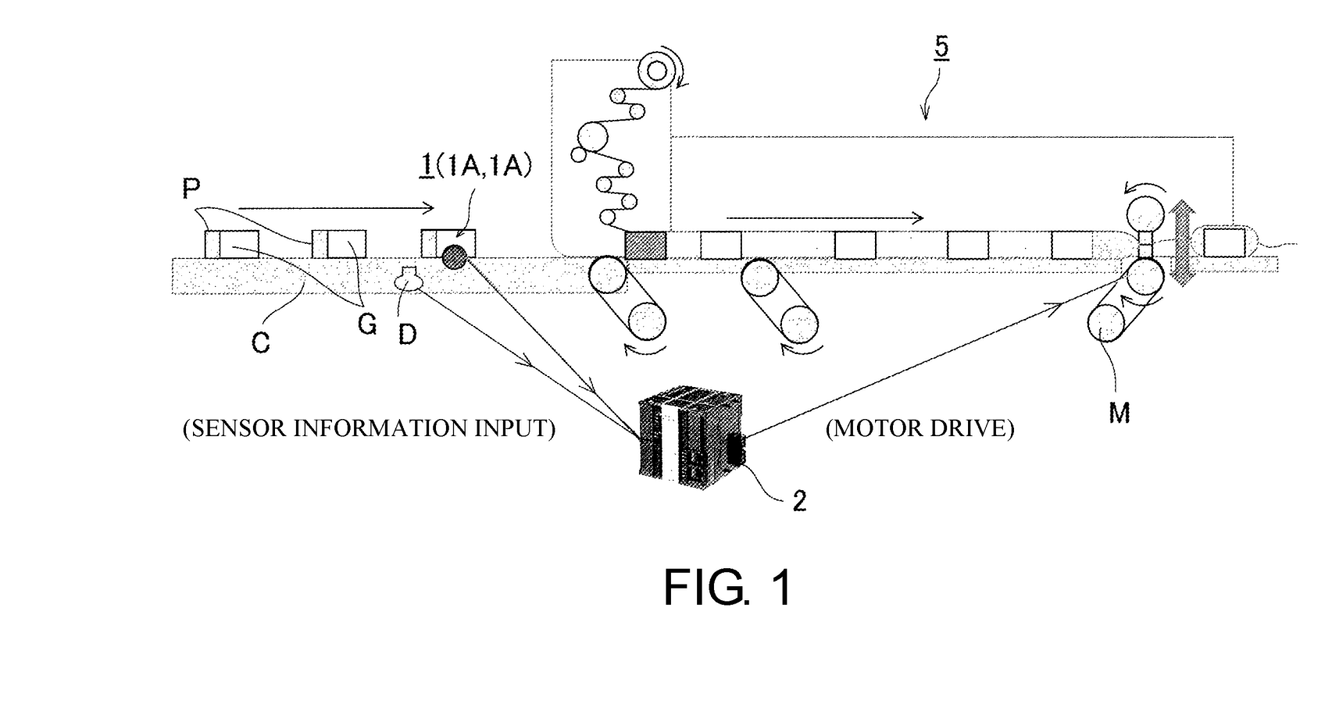
FIG. 1 is a schematic side view showing an example in which a measurement control device according to an embodiment is applied to a packaging device.

FIG. 1 is a schematic side view showing a packaging device equipped with a measurement control device according to an embodiment, and a sensor unit 1 is configured to include two sensors 1A and 1A disposed to face each other in a horizontal (width) direction, and the sensors 1A and 1A accurately detect a width of an article G to be packaged. The sensor unit 1 is disposed on the upstream side of a packaging device main body 5.

An optical type sensor or another type, for example, an ultrasonic sensor type or a mechanical type (a limit switch type) can be adopted as a sensor constituting the sensor unit 1. Further, in addition to an optical sensor, an image pickup device type sensor which can recognize an image can be used as the optical type.

A pressing member P for reliably transferring the article G to be packaged is provided on the supply conveyor C side of the packaging device, and a pressing member detection unit D for detecting the pressing member P is also disposed. The pressing member detection unit D is configured to include a dog mechanism (not shown) and the like, and is configured to transmit a detection signal (a trigger signal) to a measurement control device main body 2.

The measurement control device main body 2 receives the detection signal from the sensor unit 1, calculates a shape of the article G to be packaged, determines a control amount (a film length, a cut position, and the like) from the calculation results thereof, and drives a motor M on the packaging device main body 5 side based on the control amount thereof.

[System Configuration Example 1]

Figure 2:
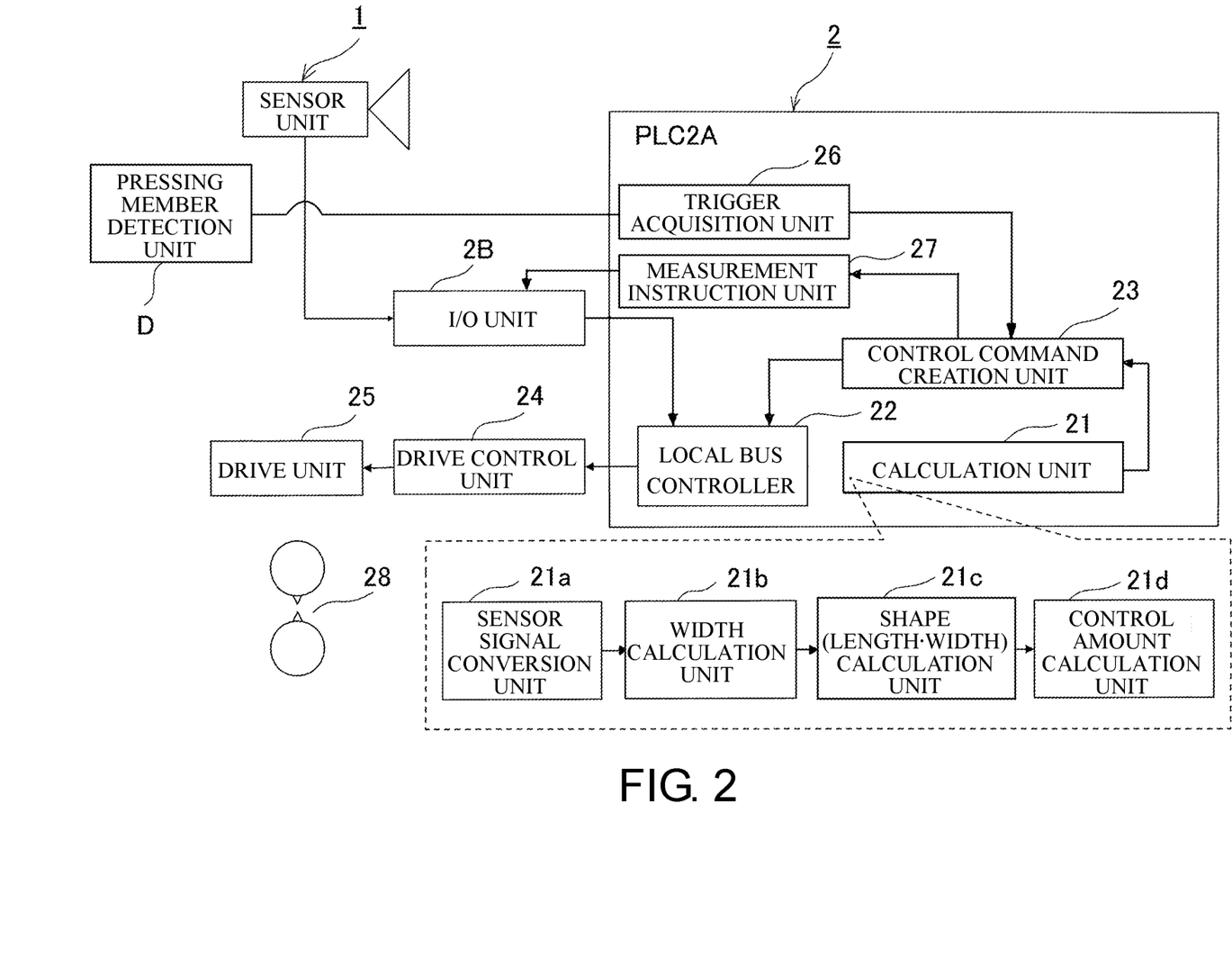
FIG. 2 is a functional block diagram showing a configuration of the measurement control device according to the embodiment.

FIG. 2 is a functional block diagram showing a system configuration of the measurement control device according to the embodiment, and the sensor unit 1 is connected to a programmable logic controller (PLC) 2A via an I/O unit 2B. The PLC 2A is configured of one or more computers including a central processing unit (CPU), a random access memory (RAM), and a read only memory (ROM), and is configured to include a calculation unit 21, a local bus controller 22, a control command creation unit 23, a trigger acquisition unit 26, and a measurement instruction unit 27 as functional blocks.

The calculation unit 21 performs various calculations, but in the case of the present embodiment, the calculation unit 21 is further divided as functional blocks, and is configured to include:

a sensor signal conversion unit 21a which processes a signal from the sensor unit 1 so that a calculation of the calculation unit 21 is enabled, a width calculation unit 21b which calculates a width of the article G to be packaged from the sensor signal, a shape (a length, a width) calculation unit 21c which calculates a length and width of the article G to be packaged from the sensor signal, and a control amount calculation unit 21d which calculates a film length, a cut position, a control amount of a drive unit 25, and the like from the obtained shape of the article G to be packaged.

The I/O unit 2B to which the sensor unit 1 is connected is connected to the local bus controller 22, and the local bus controller 22 is connected to the calculation unit 21. The local bus controller 22 controls a bus line which connects each of the functional blocks inside the PLC 2A, and controls the bus line so that functions of the PLC 2A are fully exhibited.

The calculation unit 21 is connected to the control command creation unit 23, and the control command creation unit 23 is connected to the local bus controller 22. The calculation unit 21 has a function of performing almost all of various calculation processes inside the PLC 2A, and performs many calculation processes including the above-described calculation processes.

Further, the pressing member detection unit D is connected to the trigger acquisition unit 26 inside the PLC 2A, and the trigger acquisition unit 26 is connected to the control command creation unit 23. The control command creation unit 23 is connected to the measurement instruction unit 27, and the measurement instruction unit 27 is connected to the I/O unit 2B.

The local bus controller 22 is also connected to a drive control unit 24 outside the PLC 2A, and the drive control unit 24 is connected to the drive unit 25. The drive unit 25 is configured to drive a cutter 28 and the like.

[Process Operation Example 1]

Figure 3:
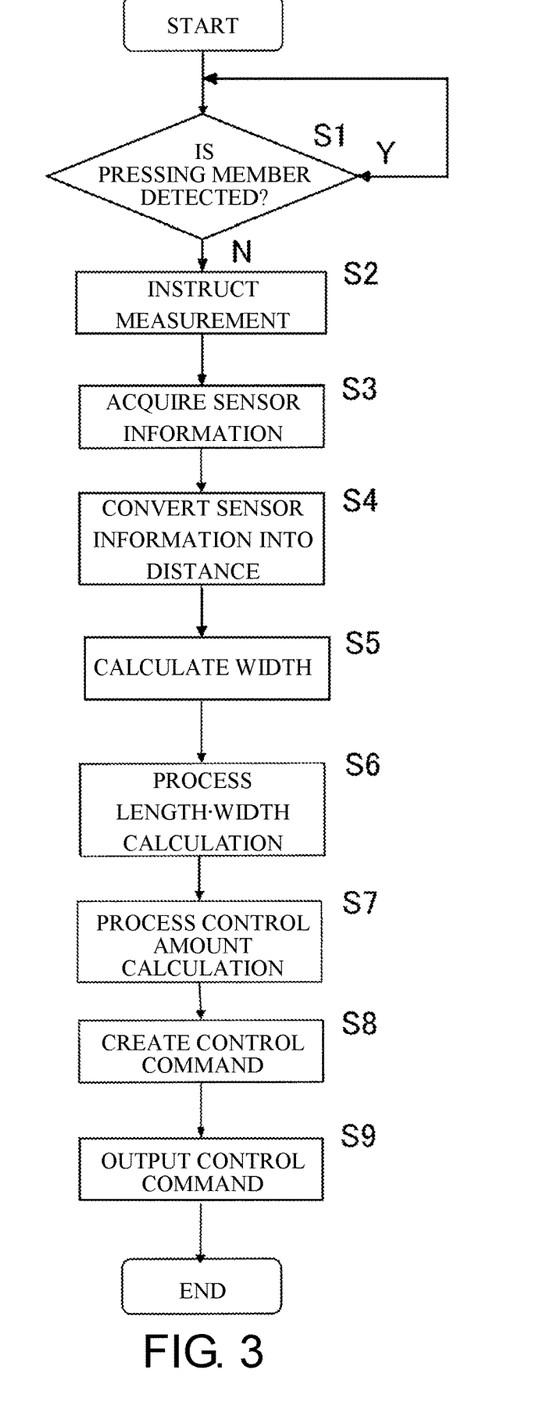
FIG. 3 is a flowchart showing an example of a process operation of the measurement control device according to the embodiment.

FIG. 3 is a flowchart showing an example of a process operation in the calculation unit 21 of the measurement control device according to the embodiment.

First, in Step S1, it is determined whether or not the pressing member P is detected. In this determination, the trigger acquisition unit 26 acquires the signal from the pressing member detection unit D, and a signal is transmitted from the trigger acquisition unit 26 to the control command creation unit 23 and is determined by the control command creation unit 23. When it is determined in Step S1 that the pressing member P is detected, the detection is continued, and whereas when it is determined in Step S1 that the pressing member P is not detected, the process proceeds to Step S2.

In Step S2, a measurement instruction is issued from the control command creation unit 23 to the measurement instruction unit 27 to acquire the signal from the sensor unit 1, and the measurement instruction is further transmitted from the measurement instruction unit 27 to the I/O unit 2B as a measurement instruction signal.

The I/O unit 2B which has received the measurement instruction signal from the measurement instruction unit 27 in Step S2 starts acquisition of an information signal from the sensor unit 1 in Step S3.

When the acquisition of the information signal from the sensor unit 1 is completed in Step S3, the process proceeds to Step S4, and in Step S4, the information signal from the sensor unit 1 is converted into a distance.

When the information signal from the sensor unit 1 is converted into a distance in Step S4, the process proceeds to Step S5, and the width of the article G to be packaged is calculated from the distance information converted in Step S4.

Next, the process proceeds to Step S6, and length information of the article G to be packaged is added, and the width and the length, that is, the overall shape of the article G to be packaged is calculated from the width information of the article G to be packaged obtained in Step S5.

Next, the process proceeds to Step S7, and a process of calculating a control amount (a film length, a determination of a cut position, a drive amount of the drive unit 25, and the like) with respect to the drive unit 25 is performed based on the overall shape information of the article G to be packaged obtained in Step S6.

Next, the process proceeds to Step S8, a control command is created based on the calculation results obtained in Step S7, then the process proceeds to Step S9, an output process of the control command created in Step S8 is performed, and then the process operation is terminated.

Figure 4:
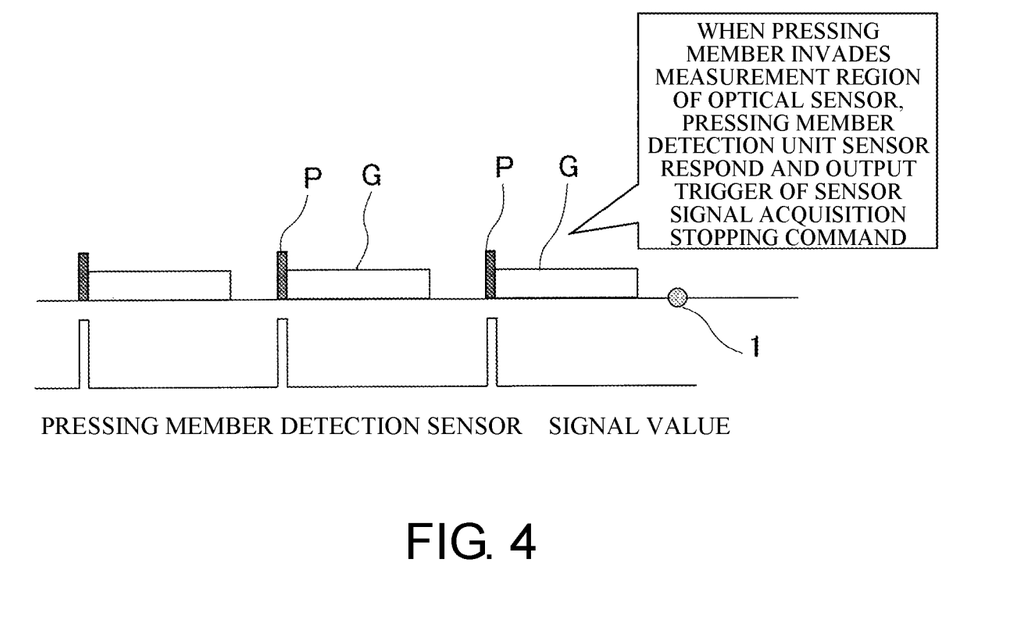
FIG. 4 is a side view showing a state in which a pressing member is sensed by the measurement control device.

FIG. 4 is a side view showing a state in which the pressing member P is sensed by the measurement control device, and shows a state in which, when the pressing member P invades a measurement region of the sensor unit 1, the pressing member detection unit D responds and serves as a trigger to stop the acquisition of the sensor signal of the sensor unit 1 when a signal value from the pressing member detection unit D increases and serves as a trigger to restart the acquisition of the sensor signal of the sensor unit 1 when the signal value from the pressing member detection unit D decreases.

According to the measurement control device of the above-described embodiment, since the acquisition of the sensor signal from the sensor unit 1 is stopped according to the detection of the pressing member P by the pressing member detection unit D, when the length of the article G to be packaged is calculated, it is possible to prevent a length of the pressing member P in a traveling direction from being acquired.

Therefore, even in the case of a packaging device of a type equipped with a pressing member P. or even in the case in which articles having different sizes and shapes, such as agricultural products and bread, are packaged, it is possible to optically perform optimal film packaging, and film packaging with a good appearance can be performed without wasting the film.

Application Example 2 of Measurement Control Device

FIG. 1 is a schematic side view showing a packaging device equipped with the measurement control device according to the embodiment. The sensor unit 1 is configured to include two sensors 1A and 1A disposed to face each other in a horizontal direction, and the width of the article G to be packaged can be accurately detected by the sensors 1A and 1A. The sensor unit 1 is disposed on the upstream side of the packaging device main body 5.

An optical type sensor or another type, for example, an ultrasonic sensor type or a mechanical type (a limit switch type) can be adopted as a sensor constituting the sensor unit 1. Further, in addition to the optical sensor, an image pickup device type sensor which can recognize an image can be used as the optical type.

The pressing member P for reliably transferring the article G to be packaged is provided on the supply conveyor C side of the packaging device, the pressing member detection unit D for detecting the pressing member P is also disposed, and the pressing member detection unit D is configured to include a dog mechanism (not shown) and the like.

However, unlike the case of the above-described Application example 1. Application example 2 is not configured so that the detection signal from the pressing member detection unit D is transmitted to the measurement control device main body 2.

The measurement control device main body 2 receives the detection signal from the sensor unit 1, calculates a shape of the article G to be packaged, determines a control amount (a film length, a cut position, and the like) from the calculation results thereof, and drives a motor M on the packaging device main body 5 side based on the control amount thereof.

[System Configuration Example 2]

Figure 5:
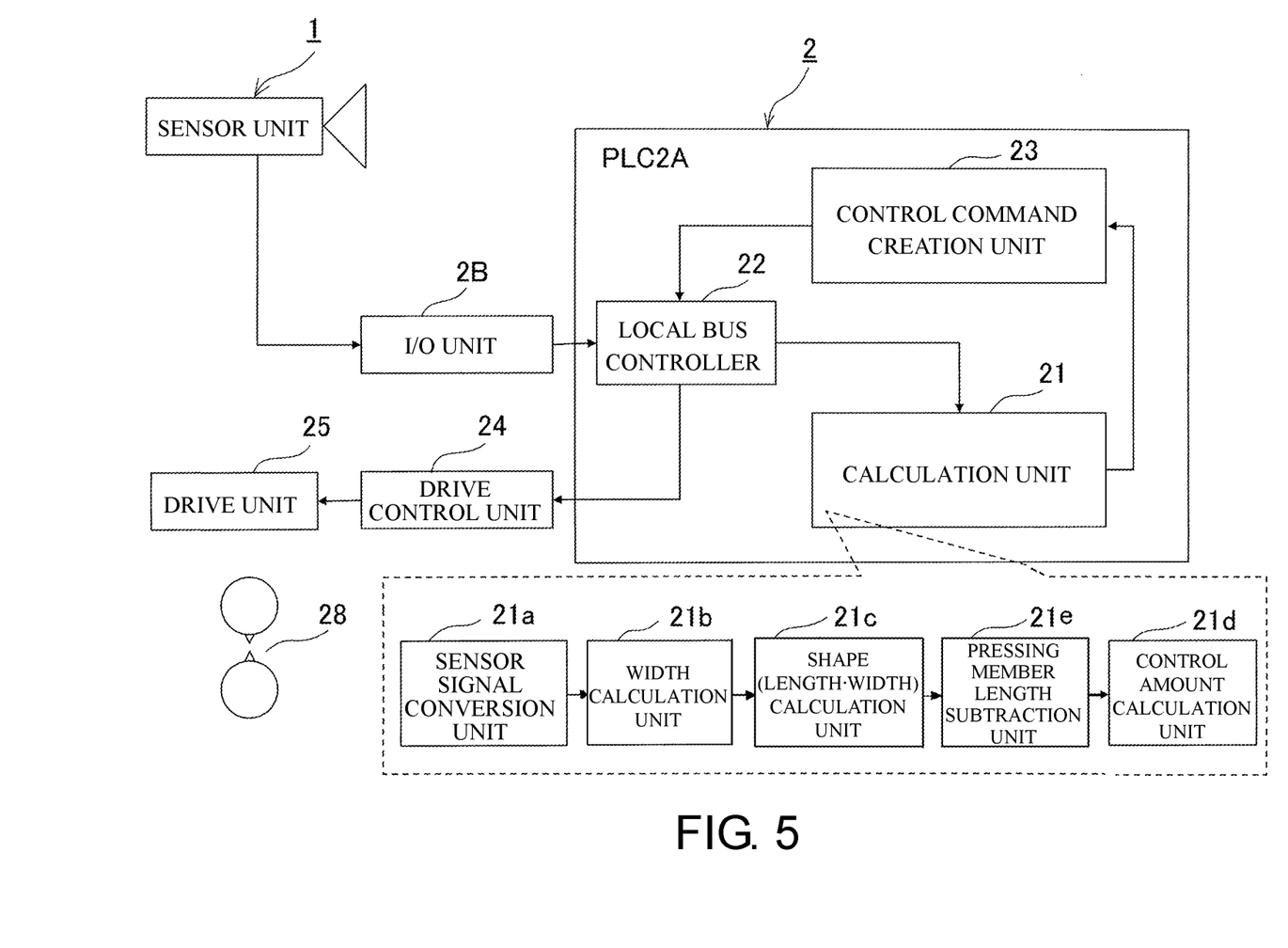
FIG. 5 is a functional block diagram showing a configuration of a measurement control device according to another embodiment.

FIG. 5 is a functional block diagram showing a system configuration of the measurement control device according to the embodiment, and the sensor unit 1 is connected to a programmable logic controller (PLC) 2A via an I/O unit 2B. The PLC 2A is configured of one or more computers including a central processing unit (CPU), a random access memory (RAM), and a read only memory (ROM), and is configured to include a calculation unit 21, the local bus controller 22, and a control command creation unit 23 as functional blocks.

The calculation unit 21 performs various calculations, but in the case of the present embodiment, the calculation unit 21 is further divided as functional blocks, and is configured to include:
  a sensor signal conversion unit 21a which processes a signal from the sensor unit 1 so that a calculation of the calculation unit 21 is enabled,
  a width calculation unit 21b which calculates a width of the article G to be packaged from the sensor signal,
  a shape (a length, a width) calculation unit 21c which calculates a length and width of the article G to be packaged from the sensor signal,
  a pressing member length subtraction unit 21e which subtracts the length of the pressing member P from the length obtained in advance by the shape calculation unit 21c, and
  a control amount calculation unit 21d which calculates a film length, a cut position, a control amount of a drive unit 25, and the like from the shape of the article G to be packaged obtained by subtraction.

The I/O unit 2B to which the sensor unit 1 is connected is connected to the local bus controller 22, and the local bus controller 22 is connected to the calculation unit 21. The local bus controller 22 controls a bus line which connects each of the functional blocks inside the PLC 2A, and controls the bus line so that functions of the PLC 2A are fully exhibited.

The calculation unit 21 is connected to the control command creation unit 23, and the control command creation unit 23 is connected to the local bus controller 22. The calculation unit 21 has a function of performing almost all of various calculation processes inside the PLC 2A and is configured to perform many calculation processes including the above-described calculation processes.

The local bus controller 22 is also connected to a drive control unit 24 outside the PLC 2A, and the drive control unit 24 is connected to the drive unit 25. The drive unit 25 is configured to drive a cutter 28 and the like.

[Process Operation Example 2]

Figure 6:
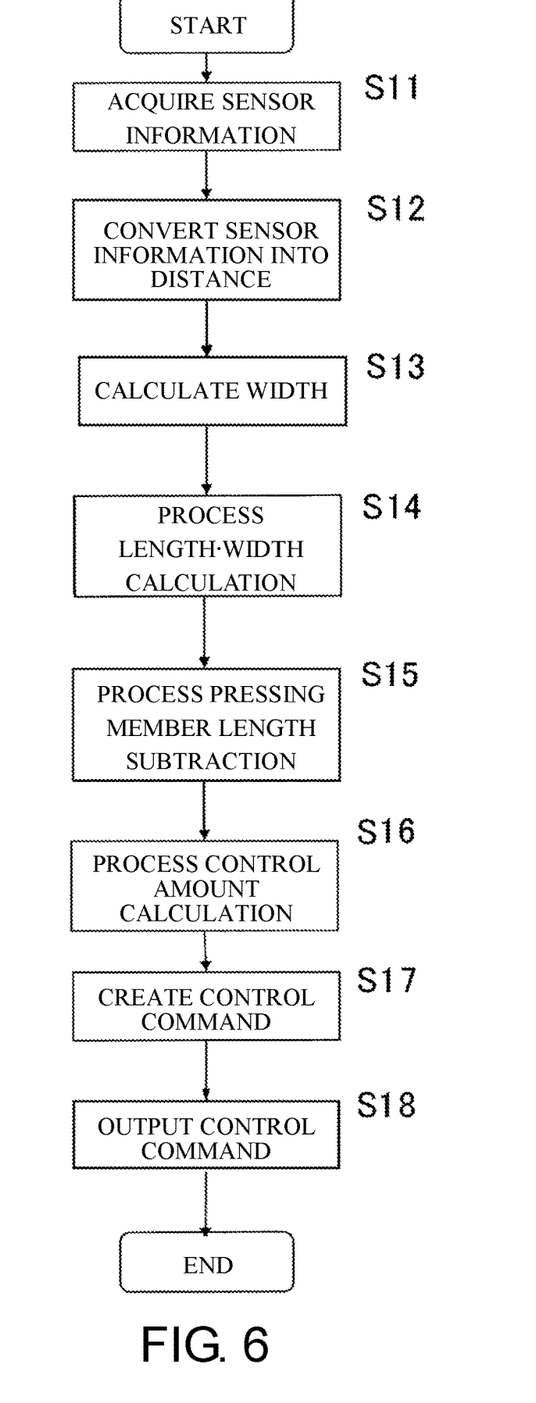
FIG. 6 is a flowchart showing an example of a process operation of the measurement control device according to another embodiment.

FIG. 6 is a flowchart showing an example of a process operation in the calculation unit 21 of the measurement control device according to the embodiment.

First, in Step S11, acquisition of the information signal from the sensor unit 1 starts.

When the acquisition of the information signal from the sensor unit 1 is completed in Step S11, the process proceeds to Step S12, and in Step S12, the information signal from the sensor unit 1 is converted into a distance.

When the information signal from the sensor unit 1 is converted into a distance in Step S12, the process proceeds to Step S13, and the width of the article G to be packaged is calculated from the distance information converted in Step S12.

Next, the process proceeds to Step S14, and length information of the article G to be packaged is added, and the width and the length, that is, the overall shape of the article G to be packaged is calculated from the width information of the article G to be packaged obtained in Step S13.

Next, the process proceeds to Step S15, and a process of subtracting the length of the pressing member P from the length information in the overall shape information of the article G to be packaged obtained in Step S14 is performed. Since the length of the pressing member P in the traveling direction is determined for each of the packaging devices, it is measured and obtained in advance.

Next, the process proceeds to Step S16, and a process of calculating a control amount (a film length, a determination of a cut position, a drive amount of the drive unit 25, and the like) with respect to the drive unit 25 is performed based on the overall shape information of the article G to be packaged after the subtraction processing obtained in Step S15.

Next, the process proceeds to Step S17, a control command is created based on the calculation results obtained in Step S16, then the process proceeds to Step S18, an output process of the control command created in Step S17 is performed, and then the process operation is terminated.

According to the measurement control device of the above-described embodiment, since the length information of the pressing member P detected and included in the sensor unit 1 can be removed by the process of subtracting the length of the pressing member P in Step S15, it is possible to prevent the length of the pressing member P in the traveling direction from being acquired in the control amount calculation process in Step S16.

Therefore, even in the case of a packaging device of a type equipped with a pressing member P, or even in the case in which articles having different sizes and shapes, such as agricultural products and bread, are packaged, it is possible to optically perform optimal film packaging by calculating the optimal control amount, and film packaging with a good appearance can be performed without wasting the film.

Modification Example

Although the embodiments of the present disclosure have been described above, the above description is merely an example of the present disclosure in all respects. Needless to say, various improvements and changes can be made without departing from the scope of the present disclosure.

For example, in the above-described embodiment, although the case in which two sensors 1A and 1A are disposed in the horizontal direction orthogonal to the traveling direction in which the article G to be packaged is conveyed has been described, in another embodiment, two sensors 1A and 1A may be disposed in the horizontal direction orthogonal to the traveling direction in which the article G to be packaged is conveyed, one sensor (1B) may be disposed in a vertical direction, and the sensor unit 1 may be configured of the sensors 1A, 1A and 1B.

Since the sensor unit 1 is configured in this way, the width of the article G to be packaged can be accurately detected by the two sensors 1A and 1A disposed in the horizontal direction, and a height of the article G to be packaged can be accurately detected by the sensor 1B disposed in the vertical direction. Since the calculation for obtaining the overall shape of the article G to be packaged based on the detected data is performed, the width, height, and length of the article G to be packaged, in other words, the overall shape profile of the article G to be packaged can be accurately obtained by the calculation.

Therefore, the accuracy of calculating the optimal control amount for each of the articles to be packaged is improved, and more optimal film packaging can be performed.

INDUSTRIAL APPLICABILITY

The present disclosure can be widely used in industrial fields such as packaging lines for film packaging of an article to be packaged, or a packaging system including the packaging lines.

What is claimed is:

1. A measurement control device used for controlling a packaging device, in which a sensor unit in which a detection axis of a sensor is disposed at least in a horizontal direction orthogonal to a traveling direction in which an article to be packaged is conveyed, and a pressing member detection unit which detects an article conveyance pressing member which is provided in the packaging device are connected to a measurement control device main body, the measurement control device comprising:
   a signal acquisition stopping unit configured to stop acquisition of a signal from the sensor unit according to detection of the pressing member by the pressing member detection unit;
   a signal acquisition restarting unit configured to restart the acquisition of the signal from the sensor unit according to non-detection of the pressing member by the pressing member detection unit;
   a width calculation unit provided on a side of the measurement control device main body to calculate a distance between the sensor unit and the article to be packaged based on information from the sensor unit and to calculate a width of the article to be packaged from the distance; and
   a shape calculation unit configured to calculate a shape of the article to be packaged;
   wherein the shape of the article comprises the width and a length of the article and the width and the length are calculated from a width information of the article which is based on the information signal of the sensor unit during acquisition,
   a control command creation unit, configured to determine a control amount with respect to a drive unit based on the shape information of the article to be packaged, and create a control command based on the control amount; and
   a drive control unit configured to control a drive unit including a motor based on the control command.

2. The measurement control device according to claim 1, wherein the sensor unit is configured by selecting one or more of an optical sensor, an ultrasonic sensor, a mechanical sensor, and an image pickup sensor.

3. A packaging device which is equipped with the measurement control device according to claim 1.

4. A measurement control method in the measurement control device according to claim 1, the method comprising:
   a signal acquisition stopping step of stopping acquisition of a signal from the sensor unit according to detection of the pressing member by the pressing member detection unit;

a signal acquisition restarting step of restarting acquisition of the signal from the sensor unit according to non-detection of the pressing member by the pressing member detection unit;
a signal acquisition step of acquiring information signal from the sensor unit;
a distance conversion step of converting the information signal acquired in the acquisition step into a distance;
a width calculation step of calculating a width of the article to be packaged from distance information converted in the distance conversion step;
an overall shape calculation step of calculating an overall shape comprising a length and a width of the article to be packaged from the acquired signal information,
wherein the width and the length are calculated from a width information of the article which is based on the information signal of the sensor unit during acquisition;
determining a control amount with respect to a drive unit based on the shape information of the article to be packaged;
creating a control command based on the control amount; and
controlling the drive unit including a motor based on the control command.

5. The measurement control method according to claim 4, further comprising:
a control amount calculation step of calculating a control amount for a drive unit based on overall shape information of the article to be packaged obtained in the overall shape calculation step;
a control command creation step of creating a control command based on a calculation result obtained in the control amount calculation step; and
an output process step of performing an output process of the control command created in the control command creation step.

6. A measurement control device used for controlling a packaging device, and the like, in which a sensor unit in which a detection axis of a sensor is disposed at least in a horizontal direction orthogonal to a traveling direction in which an article to be packaged is conveyed is connected to a measurement control device main body, the measurement control device comprising:
a width calculation unit provided on a side of the measurement control device main body to calculate a distance between the sensor unit and the article to be packaged based on information from the sensor unit and to calculate a width of the article to be packaged from the distance;
a shape calculation unit configured to calculate a shape of the article to be packaged,
wherein the shape of the article comprises the width and a length of the article and the width and the length are calculated from a width information of the article which is based on the information signal of the sensor unit during acquisition;
a pressing member length subtraction unit configured to subtract a length of an article conveyance pressing member mounted on a packaging device from the length of the article to be packaged obtained by the shape calculation unit;
a control command creation unit, configured to determine a control amount with respect to a drive unit based on the shape information of the article to be packaged, and create a control command based on the control amount; and
a drive control unit configured to control a drive unit including a motor based on the control command.

7. A measurement control method in the measurement control device according to claim 6, the method comprising:
a signal acquisition step of acquiring information signal from the sensor unit;
a distance conversion step of converting the information signal acquired in the acquisition step into a distance;
a width calculation step of calculating the width of the article to be packaged from distance information converted in the distance conversion step;
a shape calculation step of calculating the shape of the article to be packaged,
wherein the shape of the article comprises the width and a length of the article and the width and the length are calculated from a width information of the article which is based on the information signal of the sensor unit during acquisition;
a pressing member length subtraction step of subtracting the length of article conveyance pressing member mounted on a packaging device from the length of the article to be packaged obtained by the shape calculation unit;
determining a control amount with respect to a drive unit based on the shape information of the article to be packaged;
creating a control command based on the control amount; and
controlling the drive unit including a motor based on the control command.

8. The measurement control method according to claim 7, further comprising:
a control amount calculation step of calculating a control amount for a drive unit based on shape information of the article to be packaged obtained in the subtraction step;
a control command creation step of creating a control command based on a calculation result obtained in the control amount calculation step; and
an output process step of performing an output process of the control command created in the control command creation step.

* * * * *